United States Patent [19]

Raudat

[11] Patent Number: 4,966,272
[45] Date of Patent: Oct. 30, 1990

[54] PRODUCT DIVIDER

[75] Inventor: John L. Raudat, North Madison, Conn.

[73] Assignee: Standard-Knapp, Inc., Portland, Conn.

[21] Appl. No.: 411,694

[22] Filed: Sep. 25, 1989

[51] Int. Cl.⁵ .............................................. B65G 27/00
[52] U.S. Cl. .................................. 198/446; 198/836.1
[58] Field of Search ................ 198/445, 446, 458, 836

[56] References Cited

U.S. PATENT DOCUMENTS

| | | | |
|---|---|---|---|
| 3,716,127 | 2/1973 | Loeffler | 198/446 |
| 4,029,195 | 6/1977 | Hartness et al. | 198/445 X |
| 4,042,100 | 8/1977 | Morrow | 198/446 |
| 4,129,207 | 12/1978 | Cupp | 198/445 |
| 4,173,276 | 11/1979 | Raudat et al. | 198/446 X |
| 4,901,841 | 2/1990 | Haggerty et al. | 198/445 |

*Primary Examiner*—H. Grant Skaggs
*Assistant Examiner*—Cheryl L. Gastineau
*Attorney, Agent, or Firm*—McCormick, Paulding & Huber

[57] ABSTRACT

Oscillating lane guide segments define a diverging laterally shifting path for the articles tending to break up the nested articles and to facilitate feeding the articles in orderly rows more suitable for a conventional case packer. Left and right primary lane guide elements are pivotably mounted to the downstream ends of left and right stationary intake lane guides. Left and right secondary lane guide elements are pivotably mounted in turn to downstream ends of the primary lane guide segments. An actuator is provided for oscillating the left and right primary lane guide segments.

7 Claims, 3 Drawing Sheets

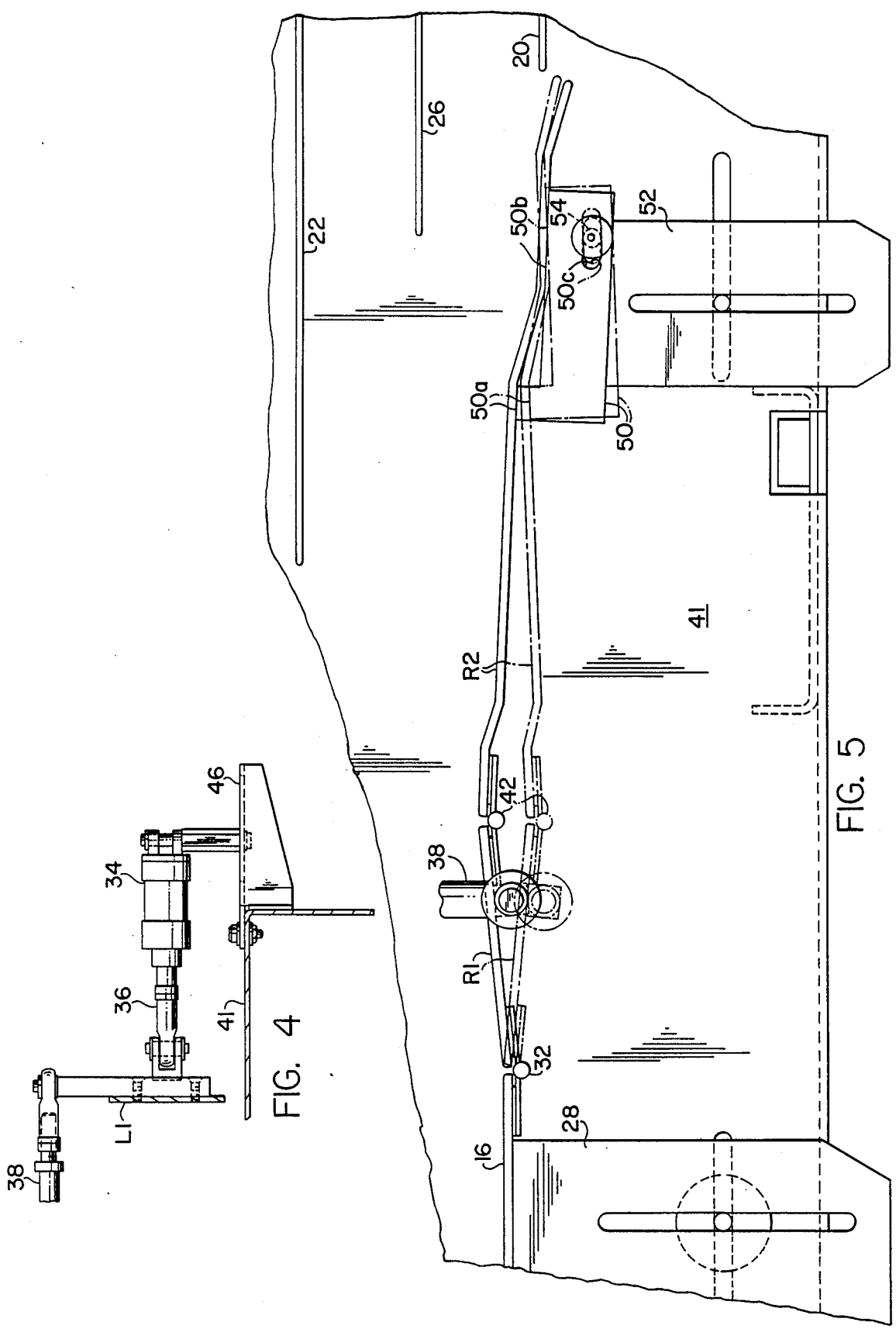

PRODUCT DIVIDER

This invention relates generally to apparatus for reorienting nested articles of cylindrical shape, and deals more particularly with dividing the nested articles into orderly individual columns. In order to pack cylindrically shaped or round articles in a conventional packing case the articles must arrive at the packer in an orderly array of article columns and rows as dictated by the size of a particular packing case. On the other hand, the articles generally move toward such a packer in a nested configuration as a result of being confined between intake lane guides and being advanced in a downstream direction by an underlying conveyor that supports the articles and frictionally engages the underside of the articles to move them in this downstream direction.

The general purpose of the present invention is to provide a divider apparatus for reorienting these nested articles, and to provide N columns of such articles between individual lane guides provided at the downstream end of the present invention.

SUMMARY OF THE INVENTION

In accordance with the present invention an infeed conveyor is provided with a fixed frame and fixed left and right vertically oriented lane guides are provided in the frame so that the inner surfaces thereof define a path for the nested articles. Left and right primary lane guide elements are pivotably mounted to the downstream ends of these left and right hand intake lane guides respectively, and means is provided for oscillating these left and right primary lane guide segments through a range of angular positions that include respective positions lying in the respective planes of the fixed left and right lane guides respectively.

Left and right secondary lane guides segments are pivotably mounted in turn to downstream ends of these primary lane guide segments, and means is provided for coupling the downstream ends of the left and right secondary lane guide segments to the fixed frame in order to control movement of these downstream ends so that the overall width of the path defined for the articles in the area of said coupling means is held to at least approximately the dimension N times d where N equals the number of columns being formed and d equals the diameter of each of the articles being reoriented.

The nested configuration of the articles between the intake lane guides calls for a path of width $\sqrt{3}/2(N-1)d+d$.

BRIEF DESCRIPTION OF THE DRAWINGS

FIG. 4 is a sectional view illustrating the oscillating means for pivoting the lane guide segments and is taken generally on the line 4—4 of FIG. 2.

FIG. 5 is a detailed view of the right hand lane guide segment illustrating the limit positions for the guide segments in solid and in phantom lines, and also illustrates in detail the means for connecting the secondary lane guide segment to the fixed frame of the machine for achieving a lateral spacing between the downstream ends of the secondary lane guide elements such as to achieve the approximate N times d path width for accommodating the side-by-side columns of articles.

DETAILED DESCRIPTION

Figure 1:
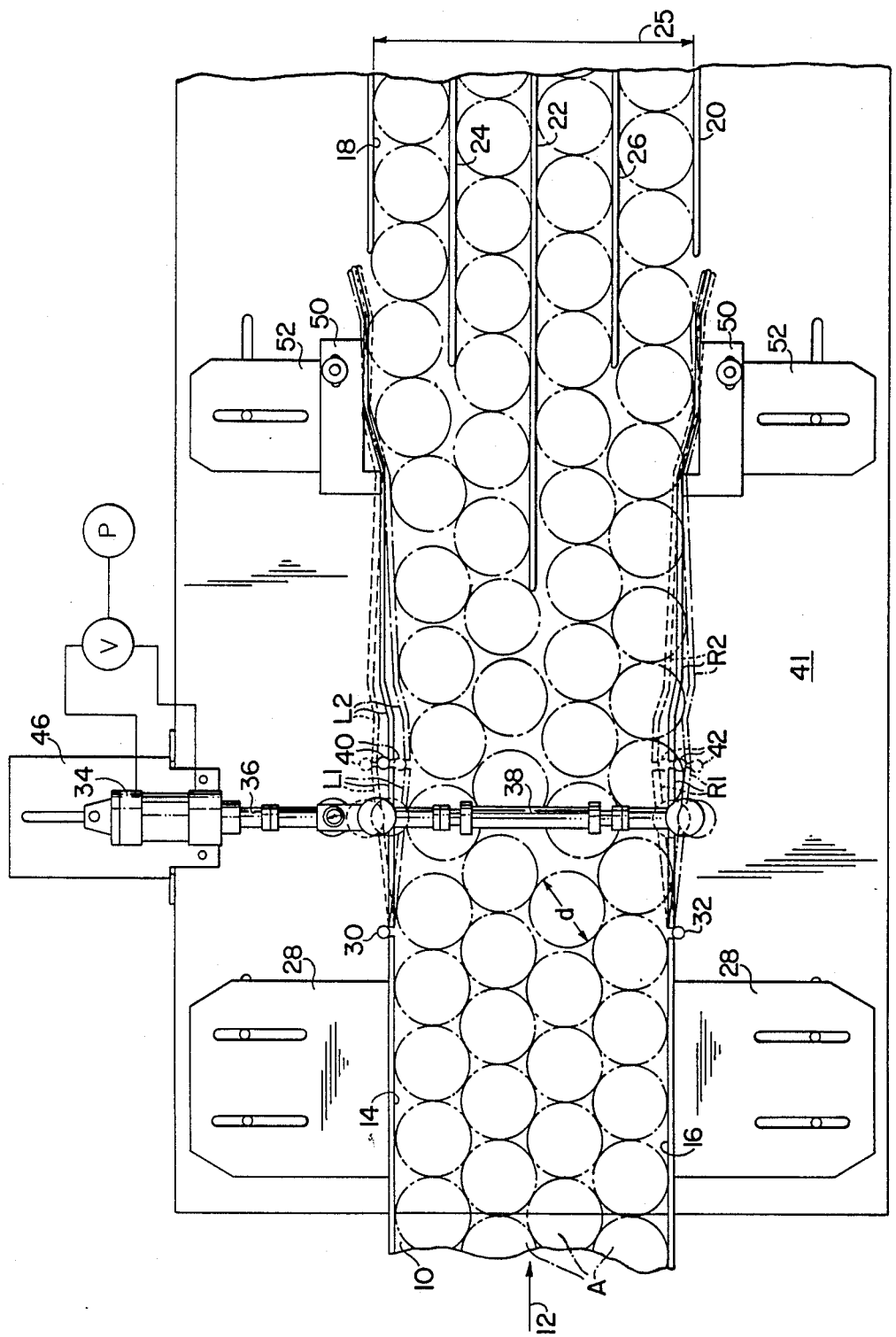
FIG. 1 is a plan view showing the essential elements of Applicant's invention with the primary and secondary lane guide segments illustrated in three positions, an intermediate or reference position shown in solid lines and limit positions shown in broken and in phantom lines. The articles are shown in phantom lines also.

Turning now to the drawings in greater detail, FIG. 1 illustrates a continuously moving conveyor 10 having an upper run or surface moving continuously in the downstream direction as indicated by the arrow 12. Nested cylindrically shaped articles A are confined between left and right hand intake lane guides 14 and 16 respectively so that a continuous supply of product can be made available to a conventional case packer (not shown) provided downstream of the apparatus to be described.

The nested cylindrically shaped articles A, A must be reoriented to provide individual columns as illustrated generally between the laterally spaced left and right side guides 18 and 20. A center guide 22 and intermediate left and right guides 24 and 26 may be provided between these side guides 18 and 20 to maintain integrity of the individual columns of articles as they pass downstream on the conveyor to the case packer.

Still with reference to FIG. 1 left and right hand vertically oriented left and right lane guide segments L1 and R1 are pivotably mounted to the downstream ends of the intake lane guides 14 and 16 respectively for movement on vertical axes located generally at the hinged joints 30 and 32 respectively. A fluid motor 34 has a movable actuator portion 36 connected through a linkage indicated generally at 38 in FIG. 1 to each of these left and right primary lane guide segments L1 and R1 for moving the same in the same direction and through equal angles so that they remain generally parallel to one another as suggested by the corresponding limit positions shown therefor in FIG. 1.

It will be apparent that as the primary lane guide segments L1 and R1 move through the angular positions shown in FIG. 1, the articles A, A are shuttled laterally breaking up the nested configuration thereof so as to facilitate entry of these articles between the individual lane guides 18–26 mentioned previously. It is an important feature of the present invention that these left and right primary lane guides segments L1 and R1 form continuations of the intake lane guides 14 and 16 as suggested generally by the solid line positions depicted for these primary lane guides segments in FIG. 1. Further, each of these primary lane guide segments has a pivotably mounted secondary lane guide segment L2 and R2 respectively at its downstream end.

These secondary left and right lane guide segments L2 and R2 have downstream ends that are coupled to the fixed frame of the apparatus to restrict movement of their downstream ends so that the overall width of the path in the area of said downstream ends is held to approximately N×d where N equals the number of lanes or columns of articles to be formed and d equals the diameter of each individual article A. That is, in FIG. 1 N equals four and except for the thickness of the lane guides 22, 24 and 26 the dimension 25 is ≈N×d.

Figure 2:
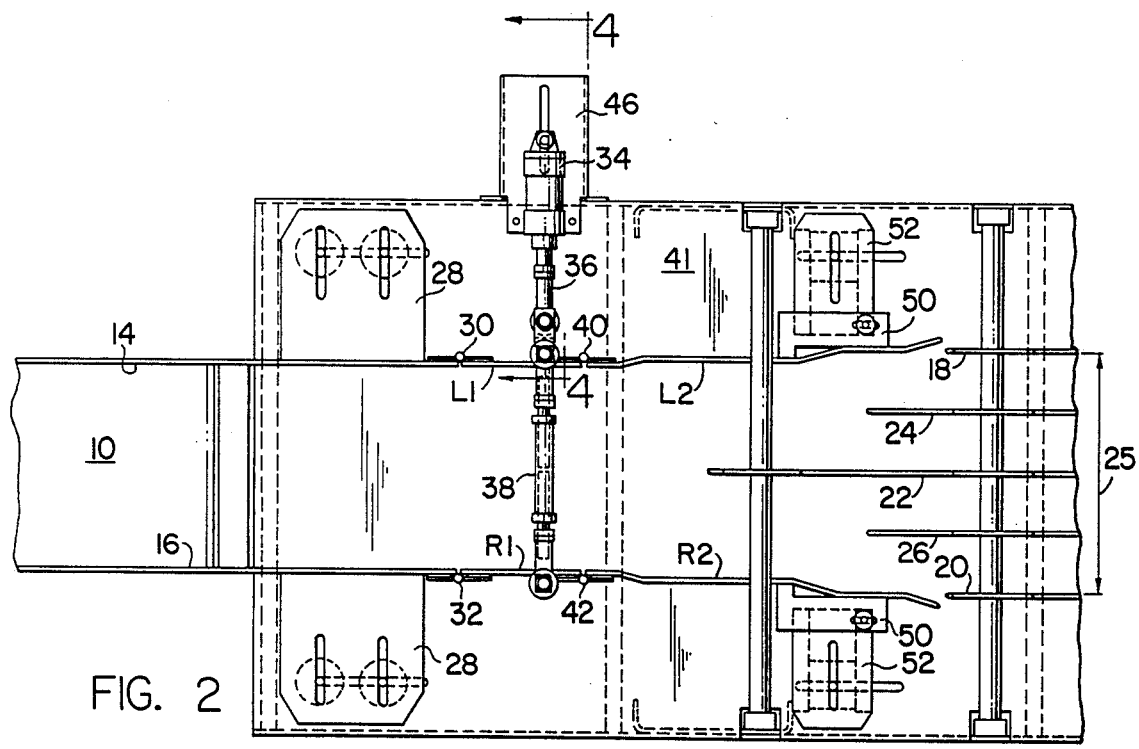
FIG. 2 is a more detailed plan view of the apparatus of the present invention without any articles, the guide segments being shown in their intermediate positions.
Figure 3:
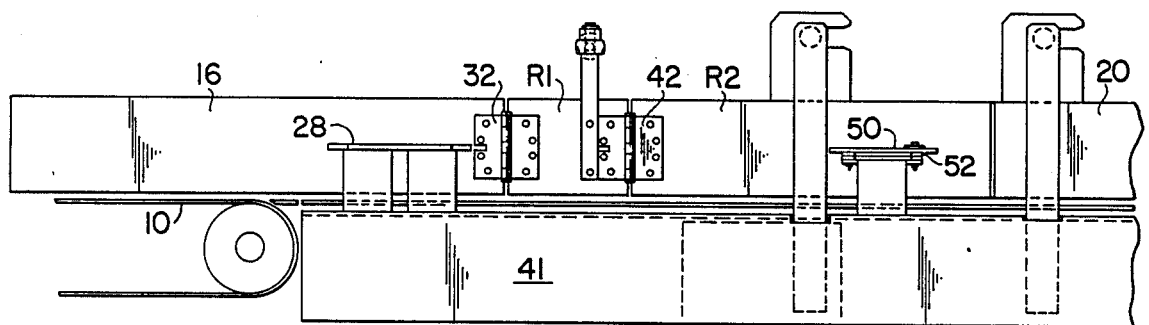
FIG. 3 is an elevational view of the apparatus illustrated in FIG. 2.

Turning next to a more detailed description of FIGS. 1 and 2, the intake lane guides 14 and 16 are supported adjacent there downstream ends by laterally adjustable brackets 28, 28 that are adjustably secured to a fixed frame 41. Butt hinges 30, 32 are secured to the downstream ends of these intake lane guides 14 and 16 and serve to pivotably support the left and right primary lane guide elements L1 and R1. Similarly butt hinges 40, 42 pivotably support the secondary left and right lane guide segments L2 and R2 at the downstream ends of these primary lane guide elements L1 and R1, respectively. The fluid motor 34 comprises an air cylinder pivotably secured to a bracket 46 so that its actuator portion 36 can act on the left primary lane guide segment L1 and through an adjustable cross link 38 also acts simultaneously on the right hand primary lane guide segment R1 to achieve parallel movement of these left and right primary lane guide segments as referred to previously.

In the intermediate positions shown in FIG. 2 for these primary lane guide segments L1 and R1, secondary lane guides segments L2 and R2 form a slightly divergent path for the articles as the articles expand laterally from their nested configuration to the side-by-side column configuration in accordance with the present invention.

Thus, in the intermediate positions for the left and right hand primary lane guide segments each forms a continuation of its' associated intake lane guides 14 and 16 respectively. The secondary lane guide segments L2 and R2 are supported adjacent their downstream ends by coupling means that permit some longitudinal movement of these secondary lane guide segments relative to the machine frame 41 while the primary lane guide segments are oscillated between the positions as suggested above with reference to FIG. 1. Each of these secondary lane guide segments L2 and R2 defines an overall width for the path of the articles in the area of its' respective downstream ends that is dictated by the number of columns of articles to be formed N and the diameter d of the individual articles being handled. Note that the lateral spacing between the intake lane guides 14 and 16 will be dictated by the nested configuration of the articles and hence have an order of magnitude $\sqrt{3}/2(N-1)d+d$. Each of the secondary lane guide segments L2 and R2 has a bracket 50 secured to its' outside surface and is coupled through a pin and slot means to a fixed bracket 52 that is adjustably located to the fixed frame 41 of the apparatus.

FIG. 5 shows the relative movement achieved by oscillating the primary lane guide element and it will be apparent that the secondary lane guide segment not only pivots at its upstream end, but that its downstream end movement is restricted to preserve the overall spacing between the downstream ends of these secondary lane guide segments dictated by the parameters N and d referred to previously as required for a particular case packer individual lane conveyor infeed setup.

To achieve this motion for the secondary lane guide segments L2 and R2 the bracket 50 is preferably secured to the outside surface of the secondary lane guide segments as suggested at 50a and 50b in FIG. 5. Pin and slot coupling means is defined in part by the bracket 50 on the backside of secondary lane guide segment R2 and in part by the bracket 52 that is adjustably mounted to the fixed frame 41 as referred to previously. One of these members defines a longitudinally extending slot 50c in which slot a pin 54 is provided to permit longitudinal movement of the secondary lane guide segment R2 as required so that the downstream end of this secondary lane guide segment remains in a particular lateral position relative to the centerline of the path of movement of the articles, and as the upstream end of the secondary lane guide segment R2 follows its' pivotal oscillatory movement dictated by that of the downstream end of the primary lane guide segment R1 all as referred to hereinabove.

I claim:

1. Apparatus for reorienting nested cylindrically shaped articles of diameter d and provide N individual columns of such articles, said apparatus comprising:
    (a) a fixed frame,
    (b) conveyor means for supporting by frictionally engaging the underside of the articles and advancing them in a downstream direction to the fixed frame,
    (c) left and right hand vertically oriented intake lane guides mounted on said frame and having inner surfaces that define a path for the nested articles said path having a width $\sqrt{3}/2(N-1)d+d$ where N equals the number of individual article columns and d equals the diameter of the articles,
    (d) left and right primary lane guide segments pivotably mounted to downstream ends of said left and right hand intake lane guides respectively,
    (e) left and right secondary lane guide segments pivotably mounted to downstream ends of said primary lane guide segments, respectively,
    (f) means for oscillating said left and right primary lane guide segments through a range of angular positions that include respective positions that lie in the respective planes of said left and right lane guides, respectively,
    (g) means coupling said left and right secondary lane guide segments to said fixed frame to control movement of the downstream ends of said left and right secondary lane segments so that the overall width of said path in the area of said coupling means and said secondary lane guide elements is held to $N \times d$.

2. The apparatus of claim 1 and said means for oscillating said left and right lane guides comprises a fluid motor having a movable and a fixed part, means connecting said fixed part to said fixed frame, means connecting said fluid motor movable part to said left and right primary lane guide segments so that said segments move in generally parallel relationship to one another as the oscillate between left and right limit positions to break up the nested orientation of the articles as they move downstream.

3. The apparatus of claim 2 and said means coupling said left and right secondary lane guide segments comprises pin and associated slot defining means said pin and slot defining means provided in part on said secondary line guide segment and in part on said fixed frame.

4. The apparatus of claim 3 wherein said slot defining means comprises left and right brackets secured to said left and right secondary lane guide segments respectively each said bracket defining a slot oriented generally parallel to said downstream direction, said pin means comprising a pin fixed in said frame and received in said slot.

5. The apparatus of claim 1 wherein said secondary lane guide segments have intermediate positions corresponding to reference positions of said primary lane guide segments wherein said respective primary lane guide segments are in the respective planes of said left and right intake lane guides, means connecting said left and right primary lane guide segments so they move together and in generally parallel relationship to one another as said primary left and right lane guide segments oscillate between left and right limit positions.

6. The apparatus of claim 5 wherein said left and right limit positions for said primary left and right lane guide segments are provided in equal-angular relationship to said reference positions thereof.

7. The apparatus of claim 6 further characterized by fixed left and right side guides downstream of said movable secondary left and right lane guide elements, said left at right side guides defining a lateral space therebetween to accommodate N individual columns of articles of diameter d.

* * * * *